(No Model.) 3 Sheets—Sheet 3.
P. J. MEDLEN.
COTTON PRESS.
No. 247,263. Patented Sept. 20, 1881.
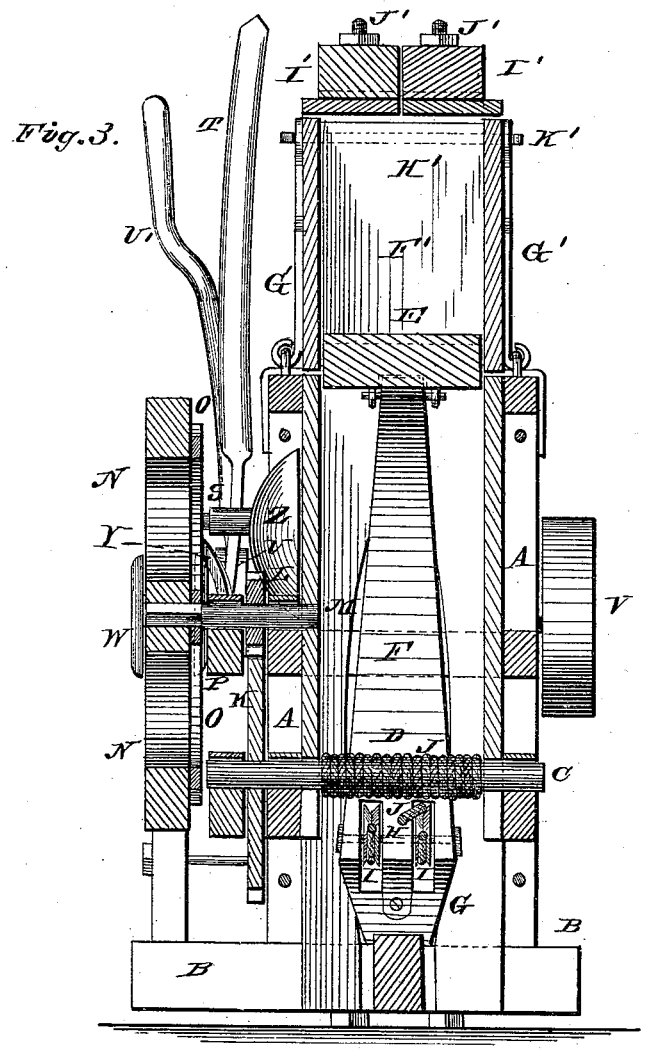
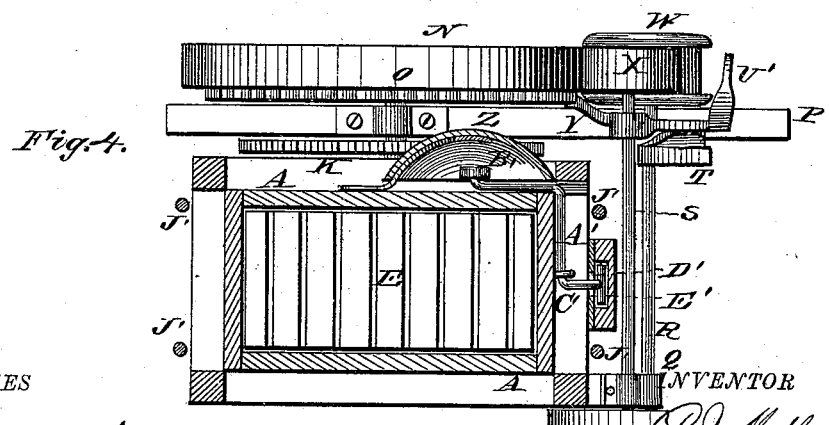
WITNESSES
Fred. G. Dieterich.
P. C. Dieterich.
INVENTOR
P. J. Medlen,
by Snow & Co.
Attorneys

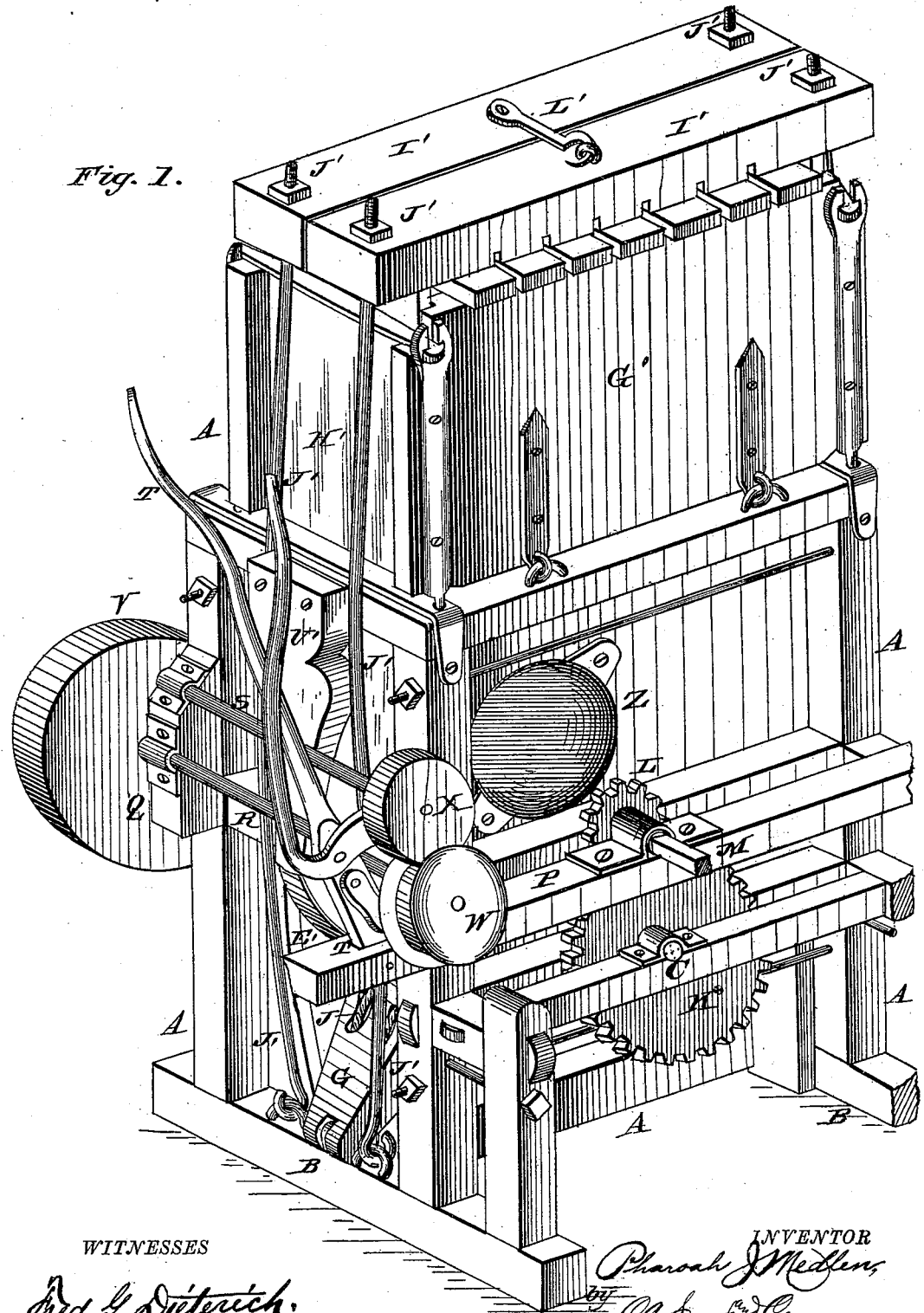

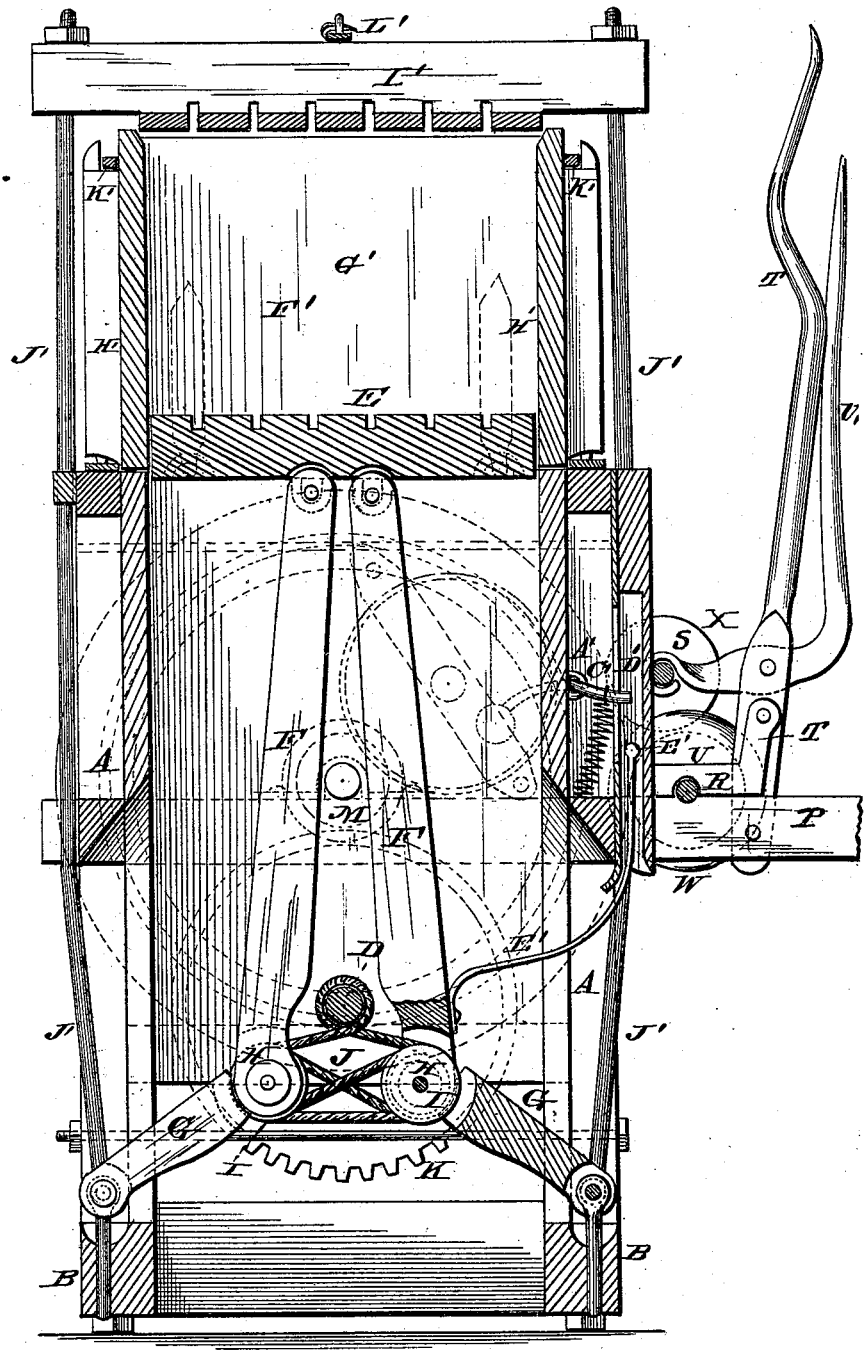

United States Patent Office.

PHARAOH J. MEDLEN, OF HACKETT CITY, ARKANSAS.

COTTON-PRESS.

SPECIFICATION forming part of Letters Patent No. 247,263, dated September 20, 1881.

Application filed July 14, 1881. (No model.)

*To all whom it may concern:*

Be it known that I, PHARAOH J. MEDLEN, of Hackett City, in the county of Sebastian and State of Arkansas, have invented certain new and useful Improvements in Cotton-Presses; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved cotton-press. Fig. 2 is a vertical sectional view. Fig. 3 is a vertical transverse section; and Fig. 4 is a horizontal sectional view.

Corresponding parts in the several figures are denoted by like letters of reference.

This invention relates to cotton-presses; and it consists in certain improvements in the construction of the same, which will be hereinafter fully described, and particularly pointed out in the claims.

In the drawings hereto annexed, A represents the frame of the machine, which is supported upon sills B B. Said frame is provided with bearings for a shaft, C, having a cylinder or drum, D.

E is the follower, which slides vertically in the box or frame A, and provided upon its under side with downward-projecting arms or levers F F, the lower ends of which are knuckle-jointed to arms G G hinged to the sills B, as shown.

Upon the pins H, which connect the levers F and arms G, are journaled pulleys I I, two upon each pin, as shown, and a rope, J, is reeved over the pulleys I and drum in such a manner that when the said drum is revolved in one direction the levers F and arms G shall be straightened out, thus raising the follower, while by reversing the motion the follower is lowered.

The shaft C carries at one end a gear-wheel, K, engaging a pinion, L, upon a shaft, M, arranged in suitable bearings above shaft C. The shaft M carries at one end a large friction-wheel, N, upon the inner side of which is secured a ratchet-wheel, O. Said friction-wheel is operated by mechanism which I shall now proceed to describe.

P Q are brackets projecting forwardly from the box or frame A, and the latter having boxes or bearings for shafts R S, arranged one above the other. The bracket P has an upright, to which is pivoted a crank-lever, T, the short or horizontal arm of which is provided with a bearing, U, for the end of shaft R.

Pivoted to the side of lever T is a second crank-lever, U', the horizontal arm of which has a bearing for the end of shaft S.

The shaft R carries at one end a belt-wheel, V, through which motion is communicated from a steam-engine or other motive power employed. The other end of shaft R has a friction-pulley, W, which may be brought in contact with the large friction-wheel N.

The shaft S has a friction-pulley, X, capable of being placed in contact with the wheels W N simultaneously.

The crank-lever T has at the end of its short arm a pivoted dog or pawl, Y, capable of engaging the ratchet O upon the inner side of wheel N.

Z is a bell or gong secured to one side of the press-frame, in the sides of which is journaled a shaft, A', having a hammer, B', to strike or sound the said bell. The shaft A' has a crank, C', projecting through a slot, D', in the side of the casing, and operated by a tongue, E', secured to the side of one of the levers F, as shown, so that whenever the follower reaches a certain height the alarm shall be automatically operated.

The press-box F' consists of sides G', hinged to the top of the casing, detachable ends H', and a top consisting of two pieces, I', secured to rods J', which are hinged to the bottom sills of the frame. The hinged sides are to be connected during operation by detachable braces K', and the top pieces, I', by a hook, L'.

In operation the top pieces of the press-box are first thrown apart in order to fill the press. They are then connected and power applied to the belt-wheel V, while the pulley W engages the friction-wheel N, so as to raise the follower and compress the bale through the above-described mechanism. When the alarm sounds the operation is ceased, and the bale is tied and removed from the press-box. The levers T U' are then operated so as to disengage pulley W from wheel N and bring the pulley X in contact with both, thus reversing the operation of the large friction-wheel N and lowering the follower.

The pawl Y, engaging the ratchet O, serves during operation to prevent any downward motion of the follower in case the belt should slip or any break occur; and it also retains the follower in position while the bale is being tied.

Having thus described my invention, I claim and desire to secure by Letters Patent of the United States—

1. The combination, in a press constructed substantially as described, of the friction-wheel N, levers T U′, shafts R S, and the friction-pulleys W X, all arranged and operating substantially as described, for the purpose set forth.

2. The combination, with the friction-wheel N, having ratchet-wheel O secured to its inner side, of the crank-lever T, friction-pulley W, and pawl Y, as herein described, for the purpose shown and specified.

3. The combination of the lever F, having tongue E′, gong or bell Z, and the shaft A′, having hammer B′ and crank C′, as herein described, for the purpose set forth.

In testimony that I claim the foregoing as my own I have hereto affixed my signature in presence of two witnesses.

PHARAOH JACKSON MEDLEN.

Witnesses:
J. S. MILLER,
JAMES W. MILLER.